(12) United States Patent
Tyan

(10) Patent No.: US 10,695,817 B2
(45) Date of Patent: Jun. 30, 2020

(54) THIRTY-SIX-CORNERED STRENGTHENING MEMBER

(71) Applicant: Ford Global Technologies, LLC, Dearborn, MI (US)

(72) Inventor: Tau Tyan, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 411 days.

(21) Appl. No.: 15/495,326

(22) Filed: Apr. 24, 2017

(65) Prior Publication Data

US 2018/0304340 A1 Oct. 25, 2018

(51) Int. Cl.
| | |
|---|---|
| *B32B 3/10* | (2006.01) |
| *B21D 47/01* | (2006.01) |
| *B62D 21/02* | (2006.01) |
| *B21D 53/88* | (2006.01) |
| *B62D 21/15* | (2006.01) |

(52) U.S. Cl.
CPC ............ *B21D 47/01* (2013.01); *B21D 53/88* (2013.01); *B62D 21/02* (2013.01); *B62D 21/15* (2013.01); *Y10T 428/24777* (2015.01); *Y10T 428/24802* (2015.01)

(58) Field of Classification Search
None
See application file for complete search history.

(56) References Cited

U.S. PATENT DOCUMENTS

| | | | |
|---|---|---|---|
| 4,876,134 A | 10/1989 | Salton et al. | |
| 7,252,314 B2 | 8/2007 | Tamura et al. | |
| 8,354,175 B2 | 1/2013 | Impero | |
| 8,430,437 B2 | 4/2013 | Asakawa et al. | |
| 8,459,726 B2 | 6/2013 | Tyan et al. | |
| 8,539,737 B2 | 9/2013 | Tyan et al. | |
| 8,573,571 B2 | 11/2013 | Langhorst et al. | |
| 8,574,286 B2 | 11/2013 | Wack | |
| 8,641,129 B2 | 2/2014 | Tyan et al. | |
| 9,073,582 B2 | 7/2015 | Tyan et al. | |
| 9,079,553 B2 | 7/2015 | Banasiak et al. | |
| 9,126,628 B2 | 9/2015 | Tyan et al. | |
| 9,174,678 B2 | 11/2015 | Tyan et al. | |
| 9,187,127 B2 | 11/2015 | Tyan et al. | |

(Continued)

FOREIGN PATENT DOCUMENTS

| | | |
|---|---|---|
| CN | 105235616 A | 1/2016 |
| EP | 0548429 A1 | 6/1993 |
| EP | 1788273 A1 | 5/2007 |

OTHER PUBLICATIONS https://web.archive.org/web/20150129041115/https://www.shapeways.conn/product/3YNAWSJ7Z/36-sided-die-2d6?optionId=7690256 retrieved on Oct. 20, 2018. Jan 29, 2015 article.*

*Primary Examiner* — Christopher M Polley
(74) *Attorney, Agent, or Firm* — David Coppiellie; Brooks Kushman, P.C.

(57) ABSTRACT

A strengthening member for an automotive vehicle includes a thirty-six-cornered cross section having adjacent sides defining internal angles and external angles. Each of the internal angles and the external angles are at least 45 degrees and are less than 180 degrees. The sides define a plurality of adjacent lobes disposed about a perimeter of the strengthening member. Along the perimeter of the thirty-six-cornered cross section, individual lobes of the plurality of lobes are separated by one external angle.

14 Claims, 7 Drawing Sheets

(56) References Cited

U.S. PATENT DOCUMENTS

| | | | |
|---|---|---|---|
| 9,566,924 B2 | 2/2017 | Nakanishi et al. | |
| 10,059,076 B2 | 8/2018 | Torriani et al. | |
| 2006/0202493 A1* | 9/2006 | Tamura | F16F 7/12 |
| | | | 293/133 |
| 2010/0016949 A1 | 1/2010 | Wack | |
| 2013/0292968 A1* | 11/2013 | Tyan | B60R 19/34 |
| | | | 296/187.03 |
| 2013/0300138 A1 | 11/2013 | Banasiak et al. | |
| 2016/0327113 A1 | 11/2016 | Shelley | |

\* cited by examiner

THIRTY-SIX-CORNERED STRENGTHENING MEMBER

TECHNICAL FIELD

This disclosure relates generally to vehicle structures, and more particularly to a strengthening member for a vehicle body or other structures, and more particularly to a strengthening member having a thirty-six-cornered cross section.

BACKGROUND

Vehicle strengthening members may be used to increase load carrying capacity, impact energy absorption, and bending resistance while reducing mass per unit length of the strengthening member.

When a compressive force is exerted longitudinally on a strengthening member (for example, a force due to a front impact load on a vehicle's front rail or other strengthening member in the engine compartment), the strengthening member may crush in a longitudinal direction to absorb the energy of the collision. In addition, when a bending force is exerted on a strengthening member (for example, a force due to a side impact load on a vehicle's front side sill, B-pillar or other strengthening member), the strengthening member may bend to absorb the energy of the collision.

Under axial loading conditions, axial collapse of a strengthening member may proceed in an unstable buckling mode that is initiated in a middle of the strengthening member before moving to a top of the strengthening member in a non-progressive manner. An unstable collapse mode may increase the variation in crash behaviors among replicate samples and may make crash performance more difficult to predict. An unstable collapse mode may also absorb less impact energy and may be less efficient in material utilization compared to a progressive and stable collapse mode.

SUMMARY

A strengthening member for an automotive vehicle includes a thirty-six-cornered cross section having adjacent sides defining internal angles and external angles. Each of the internal angles and the external angles are at least 45 degrees and are less than 180 degrees. The sides define a plurality of adjacent lobes disposed about a perimeter of the strengthening member. Along the perimeter of the thirty-six-cornered cross section, individual lobes of the plurality of lobes are separated by one external angle.

A method for manufacturing a strengthening member for an automotive vehicle includes fabricating two or more sections of the strengthening member. The method further includes joining the two or more sections to form the strengthening member having the thirty-six-cornered cross section. The thirty-six-cornered cross section includes twenty-four internal angles and twelve external angles disposed between thirty-six sides.

A strengthening member for an automotive vehicle includes a thirty-six-cornered cross section having thirty-six sides and defining twenty-four internal angles and twelve external angles. The cross section defines four adjacent lobes disposed about a central axis. Each lobe defines six internal angles and two external angles. Along a perimeter of the cross section, adjacent lobes define one external angle disposed therebetween.

DETAILED DESCRIPTION

Figure 1:
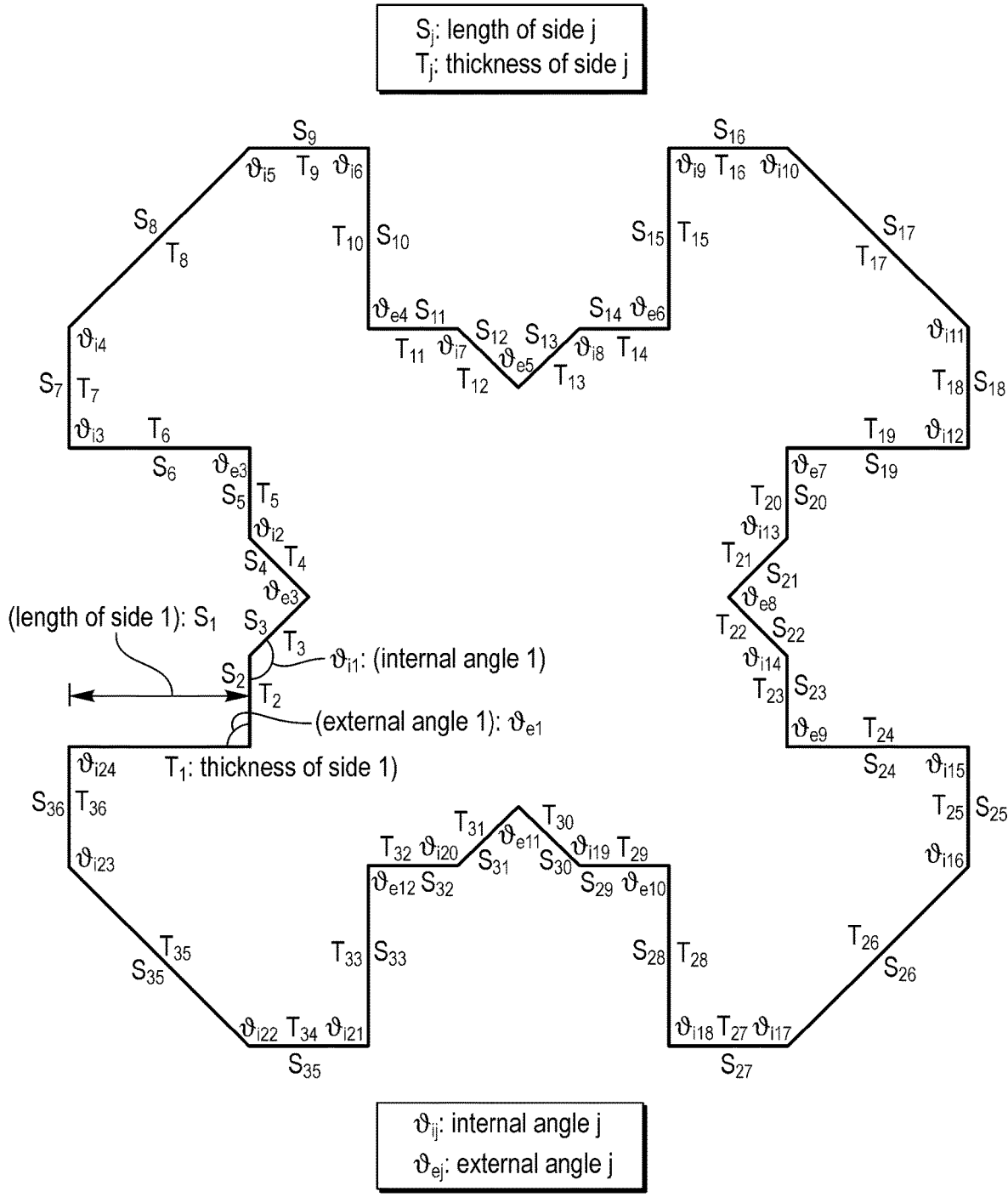
FIG. 1 illustrates an exemplary thirty-six-cornered cross section, having twenty-four internal angles and eight external angles, for a strengthening member.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure describes a strengthening member with a thirty-six-cornered cross section having a substantially increased stiffness throughout the sides and corners without increasing thickness within the corners. The strengthening member provides, for example, a variety of tunable parameters configured to achieve strength increases (i.e., load carrying and energy absorption) over basic polygonal designs (e.g., polygonal strengthening member cross sections having less or the same number of sides), while also allowing design flexibility to meet a range of vehicle applications. The strengthening member can achieve increased energy absorption and a more stable axial collapse when forces such as front and side impact forces are exerted on the strengthening member. The strengthening member may also possess improved durability and noise-vibration-harshness (NVH) performance due to work hardening on the thirty-six corners. Furthermore, the side lengths and configurations, and/or degrees of the internal and external angles, of the present disclosure can achieve a similar, if not greater, strength increase as thickened corners, while minimizing mass per unit length of the member and maintaining a high manufacturing feasibility.

Conventional strengthening members having basic polygonal cross sections, such as, square, rectangular, hexagonal and octagonal, etc., are generally used due to their manufacturing feasibility. Because strengthening members with multi-cornered cross sections in accordance with the present disclosure have substantially increased strength and stiffness without requiring thicker corner portions, they also have a higher manufacturing feasibility than previously-contemplated members that have thickened corners. While still providing a desired strength, a strengthening member in accordance with the present teachings can be formed in one or multiple sections by, for example, bending, rolling, cutting, forging, stamping, press forming, hydro-forming, molding, die casting, and extrusion. Thus-formed sections can be joined via welding, adhesive, fastening, or other known joining technologies.

A strengthening member can comprise, for example, steel alloys, aluminum alloys, magnesium alloys, titanium alloys, nylons, plastics, polymers, fiber-reinforced composites, silicone, semiconductor, papers, hybrid materials (e.g., multiple dissimilar materials), shape-memory materials, forms, gels or any other suitable materials. Those of ordinary skill in the art would understand, for example, that the material used for a strengthening member may be chosen as desired based on intended application, strength/weight considerations, cost, and other design factors.

A thirty-six-cornered cross section in accordance with the present disclosure is contemplated for use with a number of structural members such as a front rail, a side rail, a cross member, roof structures, shotguns, beltline tubes, door beams, pillars, internal reinforcements, and other components that can benefit from increased load carrying capacity, crash energy absorption, and bending resistance. In addition, the present teachings can be applied to both body-on-frame and unitized vehicles, or other types of structures.

Referring now to FIG. 1, a strengthening member may be provided with a thirty-six-cornered cross section. As illustrated, the cross section comprises thirty-six sides having lengths $S_1$-$S_{36}$ and thicknesses $T_1$-$T_{36}$, twenty-four internal corners with angles $\theta i_1$-$\theta i_{24}$ and twelve external corners with angles $\theta e_1$-$\theta e_{12}$. The side lengths and thicknesses and internal and external corner angles can be varied (i.e., tuned) to achieve improved strength and other performance features (e.g., stability of folding pattern) compared to existing strengthening member cross sections. This strength improvement may further obviate the need for increased corner thickness, which is an unexpected and unpredicted benefit of fine-tuning the design parameters (e.g., side lengths, thicknesses, internal angles, and external angles) of a strengthening member having a thirty-six-sided (i.e., thirty-six-cornered) cross section.

Figure 2C:
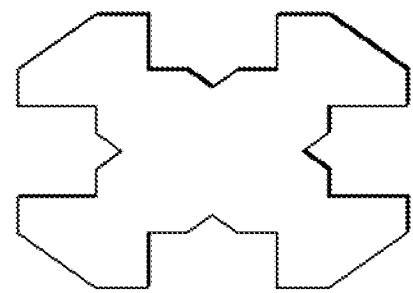
FIGS. 2A-2F illustrate how tunable parameters in accordance with the present disclosure can be utilized to modulate the cross section of FIG. 1.
Figure 2F:
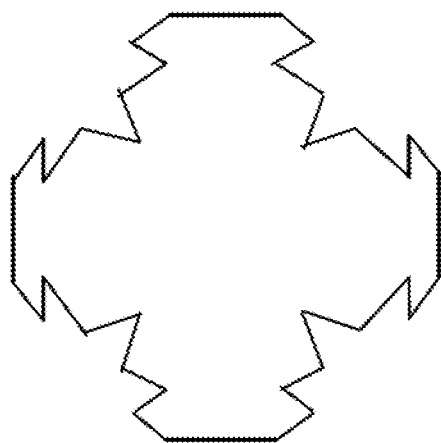
Figure 2B:
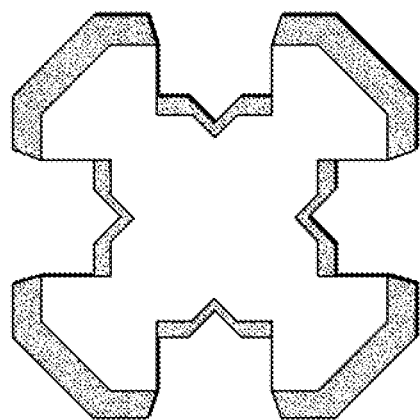
Figure 2E:
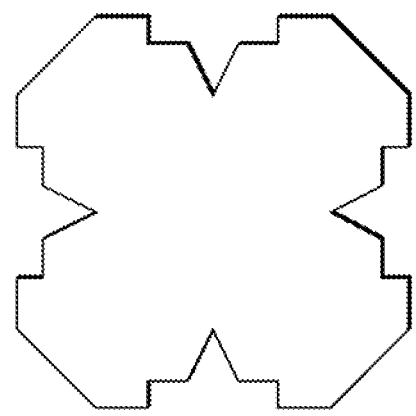
Figure 2A:
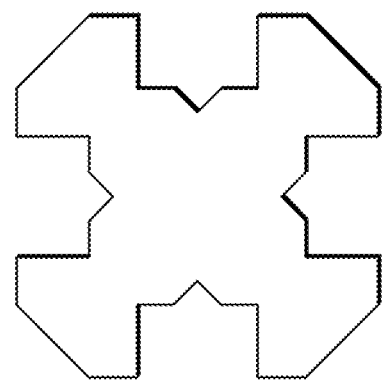
Figure 2D:
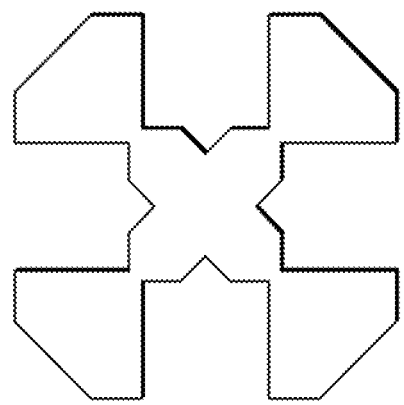

As shown in FIGS. 2A-2E, for example, in accordance with various approaches, the lengths $S_1$-$S_{36}$ (see FIGS. 2C-2E) and thicknesses $T_1$-$T_{36}$ (see FIG. 2B showing tapered sides) of the sides and the angles $\theta i_1$-$\theta i_{24}$ of the internal angles may be varied, as would be understood by one skilled in the art, for example in accordance with available packaging space within a vehicle. Those of ordinary skill in the art would understand, however, that FIGS. 2A-2E are exemplary only, and are provided merely to illustrate how design parameters can be utilized to modulate the cross section of the exemplary approach of FIG. 2. For example, angles $\theta e_1$-$\theta e_{12}$ of the external angles may also be varied, as would be understood by one skilled in the art. Thus, the present disclosure contemplates various thirty-six-cornered cross section configurations having various shapes and dimensions (i.e., corner bend radii, side lengths, thicknesses, internal angles and/or external angles), which can be adjusted based on space requirements and/or to control member collapse modes.

In certain approaches, for example, a length of each side ($S_1$-$S_{36}$) can range from about 10 mm to about 250 mm. In other exemplary approaches, such as in aircrafts, spacecrafts, watercrafts, high-speed rail vehicles, or building applications, for example, a length of each side ($S_1$-$S_{36}$) may be larger. In certain additional approaches, a thickness of the sides and corners can range from about 0.7 mm to about 6.0 mm; and in certain approaches, the thickness of the sides is substantially the same as the thickness of the corners. In other exemplary approaches, such as in aircrafts, spacecrafts, watercrafts, high-speed rail vehicles, or building applications, for example, the thickness of the side may be larger. Furthermore, in accordance with certain additional exemplary approaches, the thickness of the strengthening member may vary, for example, within one side or from side to side to optimize the overall axial crush and bending performance. The lengths $S_1$-$S_{36}$ and thicknesses $T_1$-$T_{36}$ of the sides can be varied to a certain degree, as would be understood by one skilled in the art, for example in accordance with available packaging space within a vehicle.

In certain approaches, each of the internal angles and the external angles are at least 45 degrees and are less than 180 degrees. For example, internal angles $\theta i_1$-$\theta i_{24}$ may range from about 45 degrees to about 170 degrees, and external angles $\theta e_1$-$\theta e_{12}$ may range from about 45 degrees to about 120 degrees (e.g, approximately 90 degrees). In one approach, certain internal angles (e.g., $\theta i_3$, $\theta i_6$, $\theta i_9$, $\theta i_{12}$, $\theta i_{15}$, $\theta i_{18}$, $\theta i_{21}$, and $\theta i_{24}$) may be approximately 90 degrees, and other internal angles (e.g., $\theta i_1$, $\theta i_2$, $\theta i_4$, $\theta i_5$, $\theta i_7$, $\theta i_8$, $\theta i_{10}$, $\theta i_{11}$, $\theta i_{13}$, $\theta i_{14}$, $\theta i_{16}$, $\theta i_{17}$, $\theta i_{19}$, $\theta i_{20}$, $\theta i_{22}$, and $\theta i_{23}$) may be greater than 90 degrees (e.g., approximately 135 degrees).

The thirty-six-cornered cross section defines a plurality of lobes disposed about a perimeter of the strengthening member. More particularly sides of the cross section may define internal angles and external angles that form the lobes. For example, as shown in FIG. 1, sides $S_4$-$S_{12}$ may form internal angles $\theta i_2$-$\theta i_7$ and external angles $\theta e_3$ and $\theta e_4$ to thereby define a first lobe. Sides $S_{13}$-$S_{21}$ may form internal angles $\theta i_8$-$\theta i_{13}$ and external angles $\theta e_6$ and $\theta e_7$ to thereby define a second lobe. Sides $S_{22}$-$S_{30}$ may form internal angles $\theta i_{14}$-$\theta i_{19}$ and external angles $\theta e_9$ and $\theta e_{10}$ to thereby define a third lobe. Sides $S_{31}$-$S_{36}$ and sides $S_1$-$S_3$ may form internal angles $\theta i_{20}$-$\theta i_{24}$ and $\theta i_1$ and external angles $\theta e_{12}$ and $\theta e_1$ to thereby define a fourth lobe. Thus, individual lobes of the plurality of lobes may include six internal angles and two external angles defined by nine sides. The individual lobes may be connected to adjacent individual lobes to form external angles $\theta e_2$, $\theta e_5$, $\theta e_8$, and $\theta e_{11}$ therebetween. Although four lobes are described herein, other combinations of sides and internal angles may result in more or less lobes.

Furthermore, individual lobes of the plurality of lobes may include a first side wall (e.g., distal side wall $S_8$) extending in a plane parallel to a first axis, two side walls (e.g., side walls $S_4$ and $S_{12}$) extending in planes parallel to a second axis that is perpendicular to the first axis, and six side walls (e.g., side walls $S_5$, $S_6$, $S_7$, $S_9$, $S_{10}$, and $S_{11}$) extending in planes disposed at a non-zero angle relative to the first axis. For example, the non-zero angle may be approximately 45 degrees. In this way, the angled side walls may define a first set of parallel walls (e.g., side walls $S_5$, $S_7$, and $S_{10}$) and a second set of parallel walls (e.g., side walls $S_6S_9$, and $S_{11}$) that extend perpendicular to the first set of parallel walls.

Individual lobes of the plurality of lobes may be separated by one or more external angles. In one approach, an individual lobe may be separated from an adjacent lobe by one external angle. With reference to FIG. 1, external angle $\theta e_2$ (defined by sides $S_3$ and $S_4$) may separate a first lobe from a second lobe. Thus, the individual lobes may be separated by only external angles, with no internal angles disposed therebetween. In still other approaches, the cross section may be provided with internal angles between adjacent lobes.

The lobes may be disposed about a central axis of the strengthening member around the perimeter of the strengthening member. In one approach, shown for example in FIGS. 2A, 2B, 2D, 2E, and 2F, side walls of the lobes are evenly spaced about the central axis. In another approach, shown for example in FIG. 2C, side walls of the lobes may be unevenly spaced about the central axis. In this approach, the cross section of the strengthening member may be provided with a 10/7 aspect ratio, as compared to the cross sections of FIGS. 2A, 2B, 2D, 2E, and 2F. As shown in FIG. 2C, a first side wall of a first lobe may be spaced a first distance from a second side wall of a second lobe adjacent to the first lobe along the perimeter. A third side wall of the first lobe may be spaced a second distance from a fourth side wall of a third lobe adjacent to the first lobe along the perimeter. In this approach, the first and second distances have different lengths. For example, the first distance may be greater than the second distance.

As shown in FIG. 2F, the thirty-six-cornered cross section may define relatively a shallow recess design. In this approach, internal and/or external angles can be less than 90 degrees (e.g. approximately 45 degrees).

Figure 3:
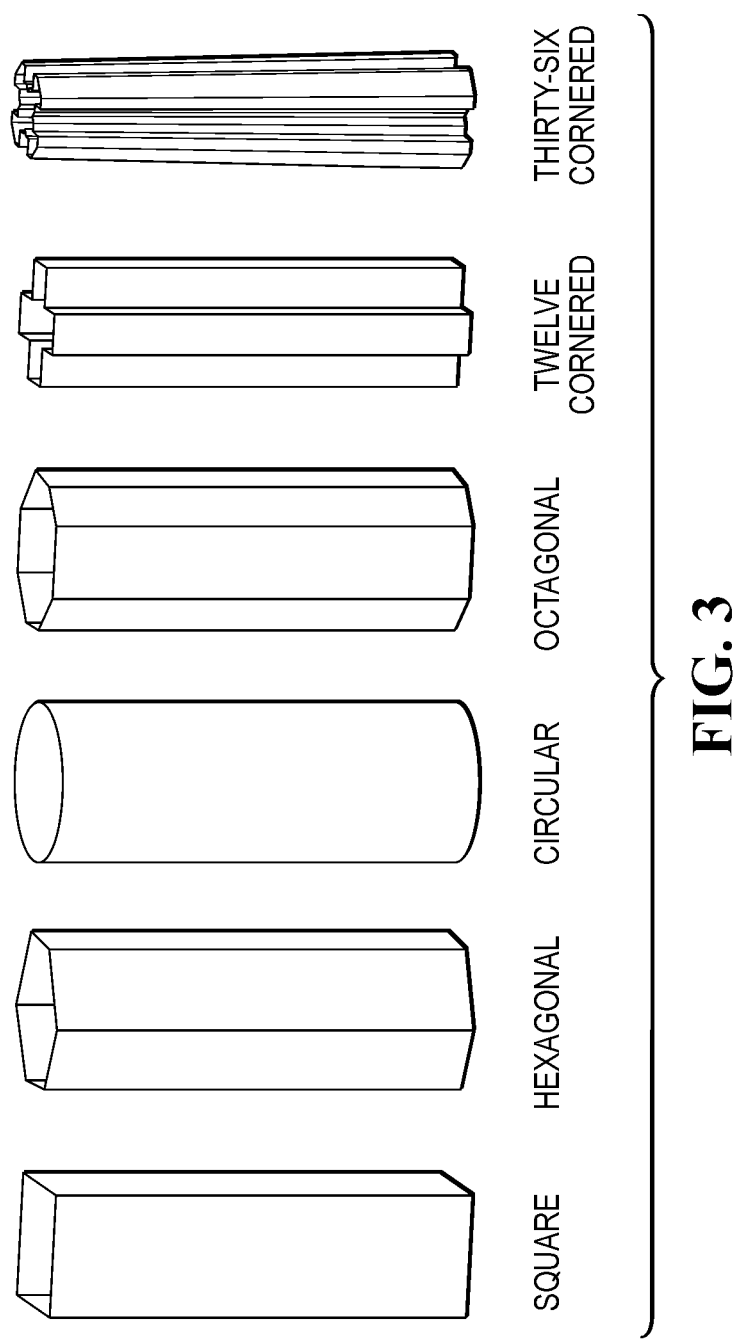
FIG. 3 illustrates strengthening members of varying cross sections having substantially the same thickness, length, and perimeter.

In comparing crash energy absorption of strengthening members of varying shapes having the same thickness and perimeter, as illustrated in FIG. 3, for example for an impact with a rigid wall at 35 mph, a thirty-six-cornered cross section in accordance with the present disclosure may result in a shorter crush distance and smaller folding length. The thirty-six-cornered cross section may also provide improved axial collapse stability and improved crash energy absorption. For example, a thirty-six-cornered cross section in accordance with the present disclosure may achieve about a 100-150% increase in crash energy absorption over a square cross section and a 90-115% increase in crash energy absorption over hexagonal and octagonal cross sections.

To demonstrate the improved strength and performance features of a thirty-six-cornered cross section in accordance with the present disclosure compared to various existing cross section designs, exemplary strengthening members were modeled and experimental test runs were conducted, as shown and described below with reference to FIGS. 3-7.

Figure 4:
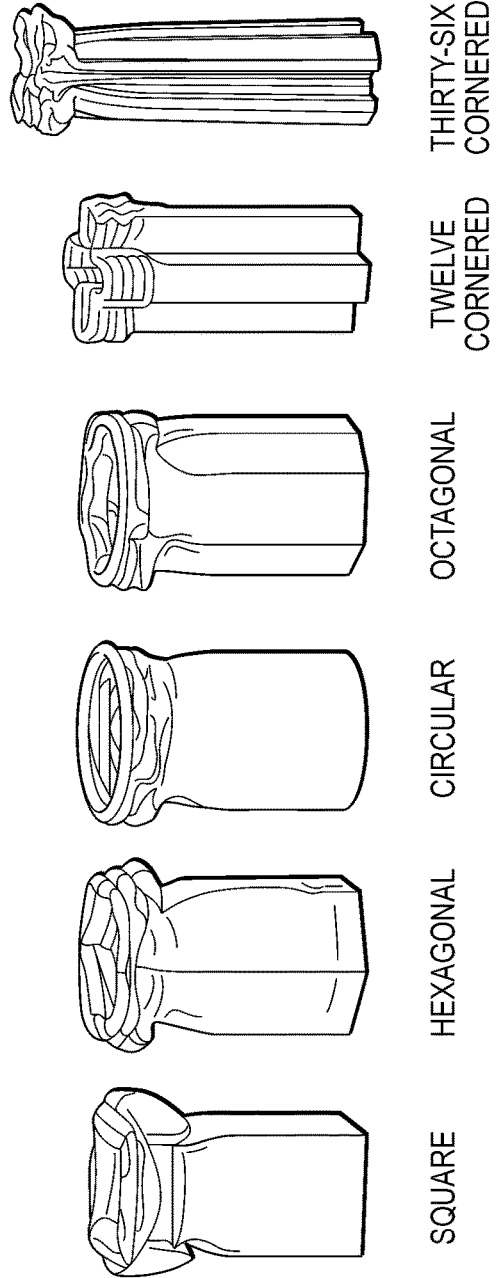
FIG. 4 illustrates an exemplary axial collapse of the strengthening members shown in FIG. 3.
Figure 5:
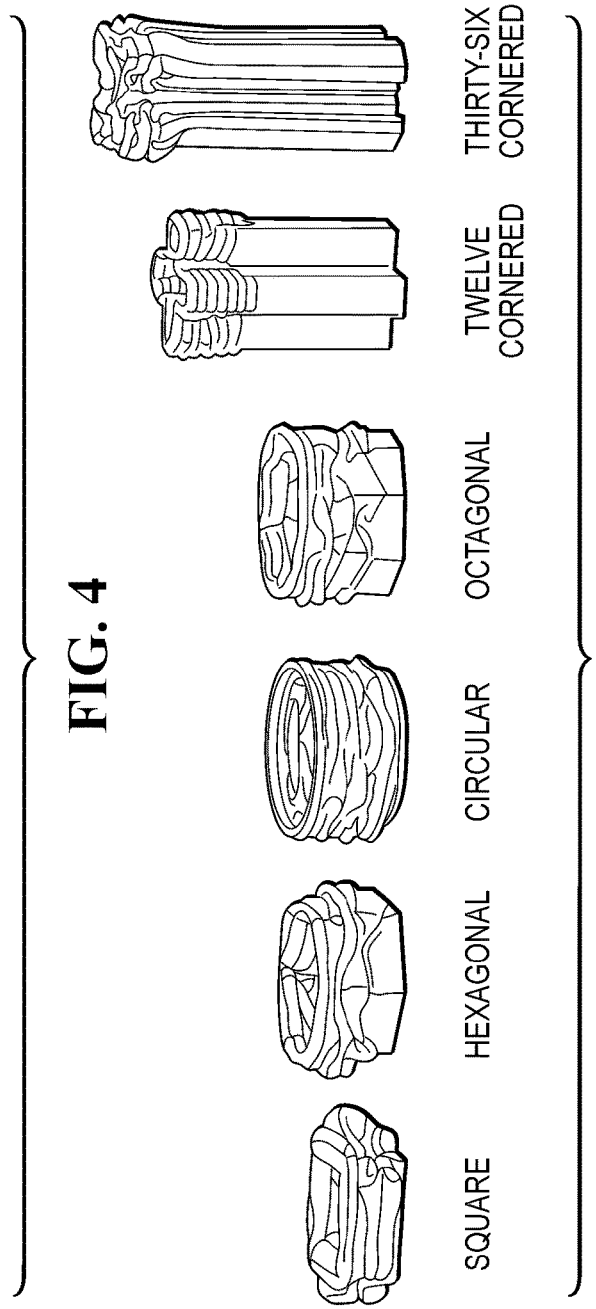
FIG. 5 illustrates an exemplary dynamic crush of the strengthening members shown in FIG. 3.

Strengthening members of varying shapes (i.e., cross sections) having the same thickness, length and perimeter (e.g., each part having a mass of about 1.22 Kg) were modeled as illustrated in FIG. 3. Tests were then run for each member to simulate an impact with the same rigid mass (e.g. an impactor), impact speed, and initial kinetic energy. As shown in FIG. 4, the thirty-six-cornered cross section in accordance with the present disclosure demonstrated the most stable axial collapse and the highest crash energy absorption. Furthermore, as shown in FIG. 5, the thirty-six-cornered cross section in accordance with the present disclosure also demonstrated the shortest crush distance and smallest folding length.

Figure 6:
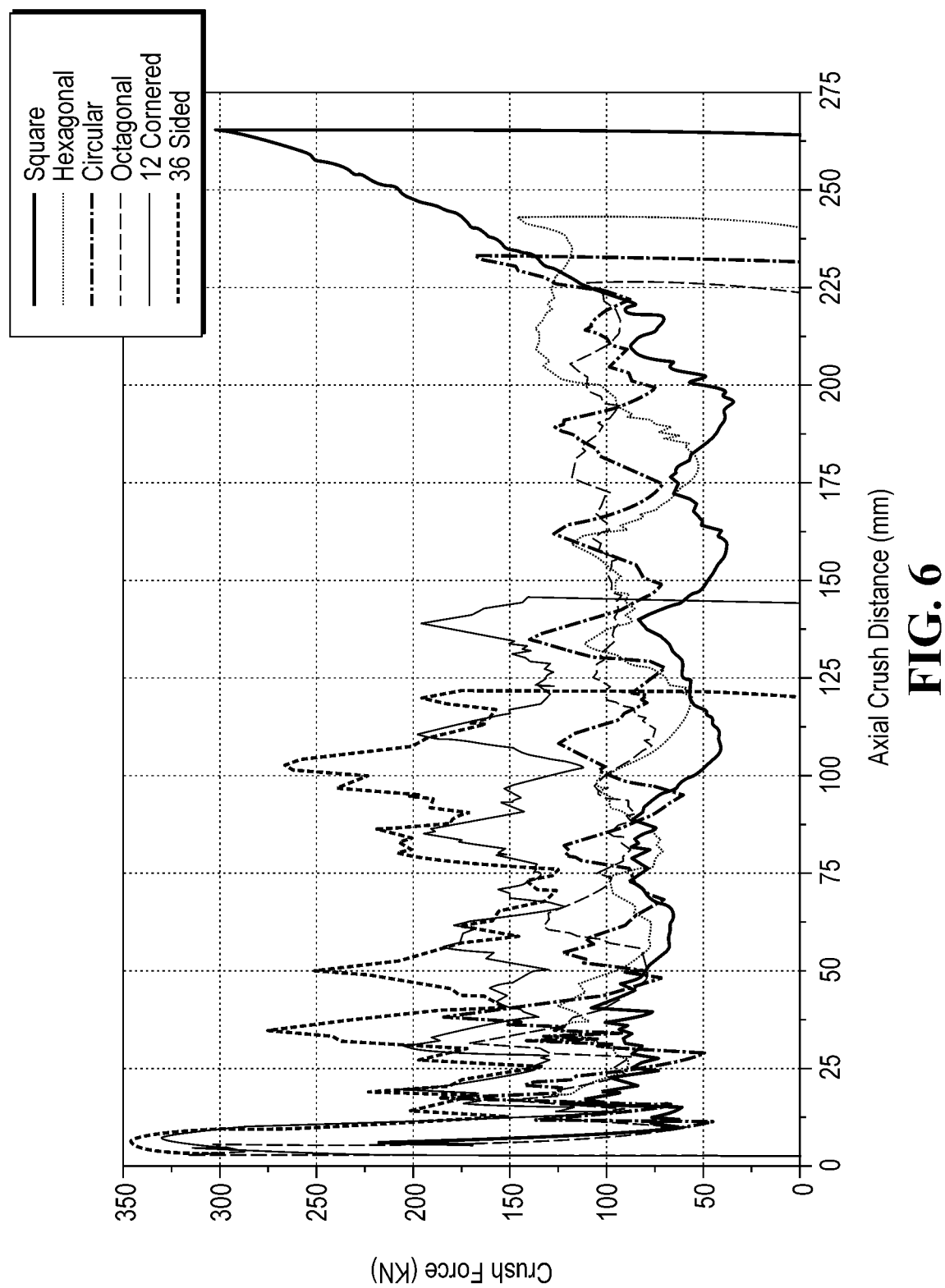
FIG. 6 is a graph of the crush force and associated axial crush distance for exemplary strengthening members having the cross sections shown in FIG. 3.

FIG. 6 illustrates the crush force (in KN) and associated axial crush distance (in mm) for the simulated impact, exerted axially on the exemplary strengthening members having the cross sections shown in FIG. 3. As shown in FIG. 6, the strengthening member having a thirty-six-cornered cross section could sustain a much higher crushing force for a given resulting crushing distance as compared with the square, hexagonal, circular and octagonal cross sections. This allows improved impact energy management while minimizing mass per unit length.

Figure 7:
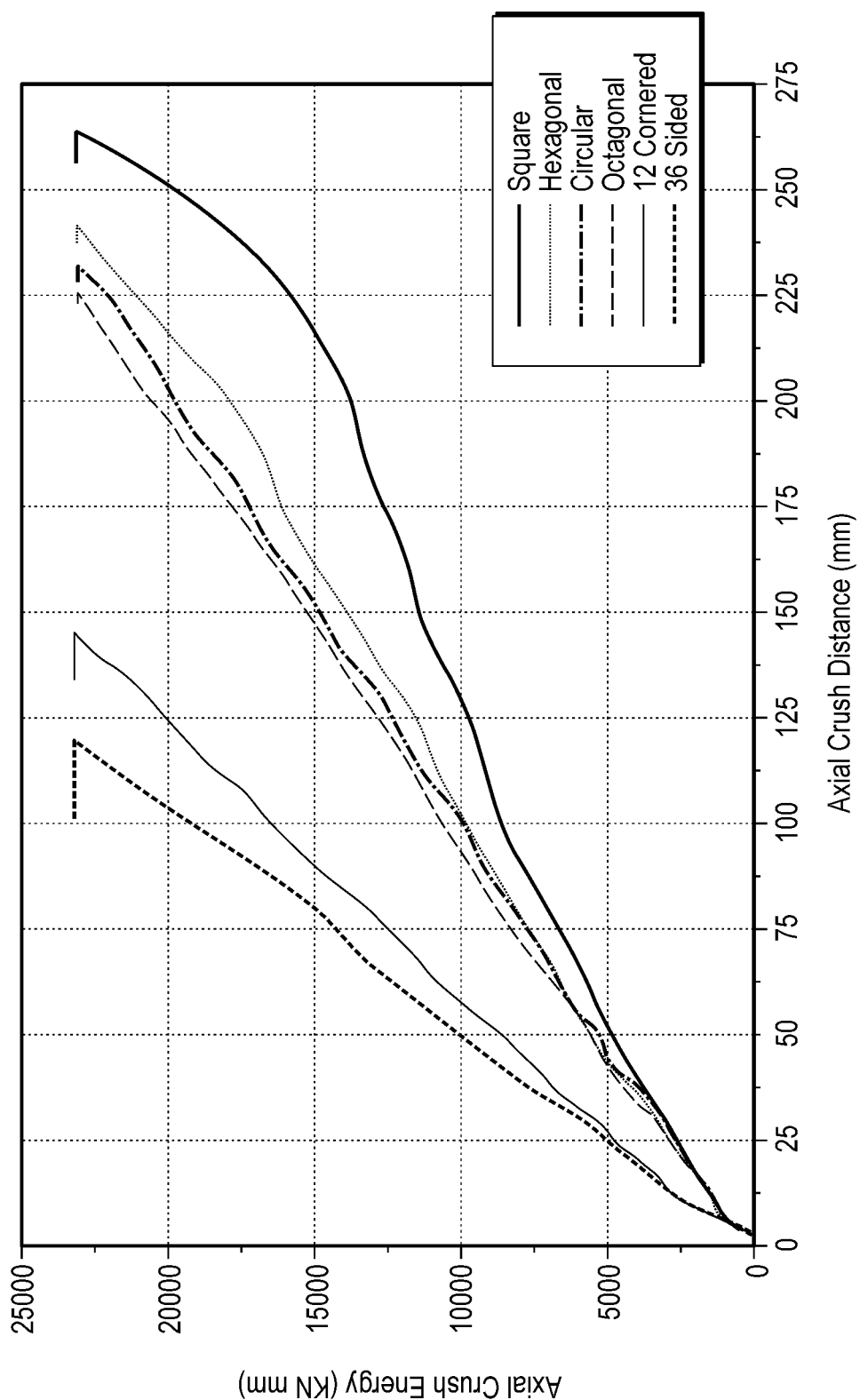
FIG. 7 is a graph of the axial crush energy and associated axial crush distance for exemplary strengthening members having the cross sections shown in FIG. 3.

FIG. 7 illustrates the axial crush energy (in KN-mm) and associated axial crush distance (in mm) for the exemplary strengthening members having the cross sections shown in FIG. 3. As shown in FIG. 7, the strengthening member having a thirty-six-cornered cross section could absorb the total kinetic energy of the impact (i.e., 22,983 Kn-mm) over a much shorter distance as compared with the square, hexagonal, circular and octagonal cross sections.

Figure 8B:
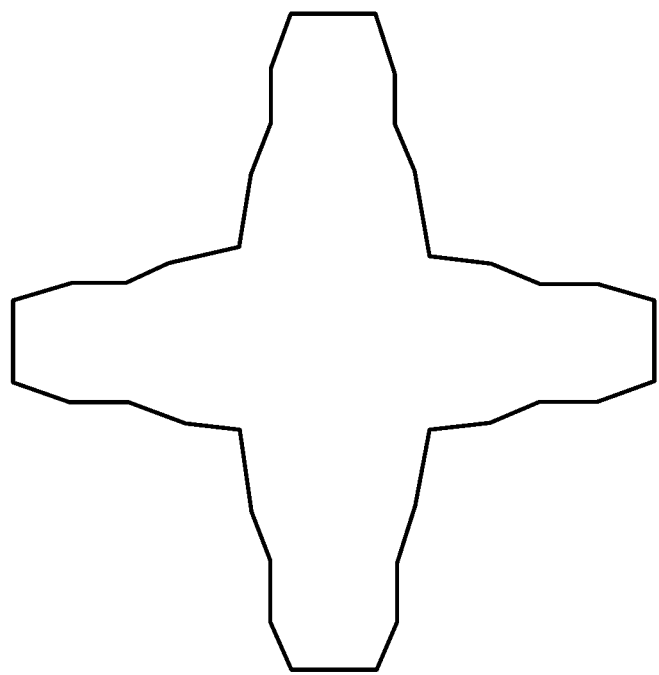
FIGS. 8A and 8B illustrate exemplary thirty-six-cornered cross sections, having twenty-four internal angles and twelve external angles, for a strengthening member.
Figure 8A:
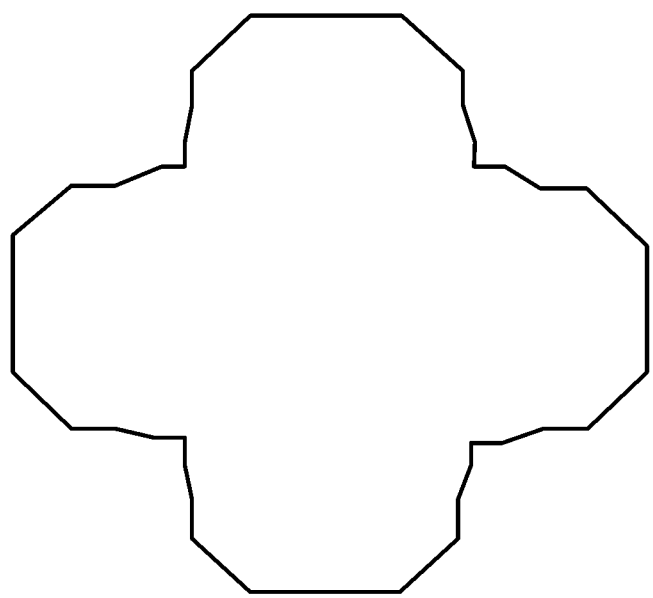

Referring now to FIGS. 8A and 8B, a strengthening member may be provided with a thirty-six-cornered cross section. In the approaches of FIGS. 8A and 8B, the thirty-six-cornered cross section defines twenty-four internal angles and twelve external angles. As shown, the twenty-four internal angles may be greater than 90 degrees. In the approach shown in FIG. 8A, certain external angles (e.g, eight external angles) may be greater than 90 degrees (e.g., 135 degrees), and certain other external angles (e.g., four external angles) may be approximately 90 degrees. In the approach shown in FIG. 8B, all external angles are greater than 90 degrees. For example, certain external angles (e.g, eight external angles) may be approximately 135 degrees, and certain other external angles (e.g., four external angles) may be approximately 110-115 degrees. The strengthening member may define a continuous taper along a substantial length of the strengthening member from a first end of the strengthening member to a second end of the strengthening member.

In many approaches, the strengthening member may be disposed at an exterior of a vehicle, and therefore may be exposed to moisture and other elements such as rain, snow, salt, mud, etc. Such elements may cause corrosion problems, particularly, for example, in accumulation regions such as recesses or indentations. The strengthening members according to FIGS. 8A and 8B may provide improved moisture shedding as compared to known strengthening members. For example, increasing the external angles to greater than 90 degrees increases the contact angle of moisture contacting the strengthening member at the external angle, thereby increasing the hydrophobicity of the strengthening member at the external angle. In this way, a strengthening member (e.g., a strengthening member disposed at an exterior of a vehicle) that may be exposed to moisture may be provided with improved moisture shedding capabilities.

A method for manufacturing a strengthening member for an automotive vehicle may include fabricating two or more sections of the strengthening member. Fabricating the two or more sections may include stamping, press forming, roll forming, hydroforming, molding, casting, machining, forging, 3-D printing, and/or extruding each of the two or more sections.

The method may further include joining the two or more sections to form the strengthening member having the thirty-six-cornered cross section. The two or more sections may be joined by one or more of welding, adhesion, and fastening. The thirty-six-cornered cross section includes twenty-four internal angles and twelve external angles disposed between thirty-six sides. Each of the internal angles and the external angles are at least 45 degrees and are less than 180 degrees.

Thirty-six-cornered cross sections in accordance with the present disclosure may, therefore, allow improved impact energy management over, for example, basic polygonal strengthening member cross sections, including basic twenty-sided polygonal cross sections, while minimizing mass per unit length.

Thus, as illustrated, strengthening members in accordance with the present disclosure are configured to achieve strength increases (i.e., load carrying and energy absorption) over basic polygonal designs (including polygonal strengthening member cross sections having the same number of sides), while also permitting flexibility in design to better meet vehicle space requirements. Such strengthening members may, therefore, be used to replace existing strengthening member cross section designs (both traditional and non-traditional).

Various exemplary approaches of the present disclosure contemplate, for example, strengthening members with corners having different bend radii, with non-uniform cross sections (e.g., having non-symmetrical shapes), and/or with sides having variable thicknesses (i.e., having tapered sides). Various additional exemplary approaches contemplate strengthening members that are bent and/or curved. Moreover, to further adjust a member's folding pattern and/or peak load capacity, various additional exemplary approaches also contemplate strengthening members having trigger holes, flanges, and/or convolutions as would be understood by those of ordinary skill in the art.

Furthermore, multi-cornered strengthening members in accordance with the present disclosure are contemplated for use with a number of structural members, such as, for example, crush cans, front rails, mid-rails, rear rails, side rails, shotguns, cross members, roof structures, beltline tubes, door beams, pillars, internal reinforcements, and other components that can benefit from increased crash energy absorption. In addition, such strengthening members can be applied to both body-on-frame and unitized vehicles, or other types of structures. Thus, depending on application, strengthening members may have varied shapes (i.e. various cross sections) to accommodate specific member space constraints. When used as a vehicle front rail, for example, to achieve optimized axial crush performance, the lengths and thicknesses of the sides and/or angles of the corners can all be adjusted (tuned) to provide optimal strength, size and shape to meet engine compartment constraints.

Although various exemplary approaches described herein have been described as configured to be used with automotive vehicles, it is envisioned that the various strengthening members in accordance with the present disclosure may be configured for use with other types of vehicles and/or structures, for which it may be desirable to provide increased load carrying capacity, crash energy absorption, and bending resistance. Thus, it will be appreciated by those of ordinary skill in the art having the benefit of this disclosure that the present disclosure provides strengthening members for various applications. Further modifications and alternative embodiments of various aspects of the present disclosure will be apparent to those skilled in the art in view of this description.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A strengthening member for an automotive vehicle, the strengthening member comprising:
    a thirty-six-cornered cross section having adjacent sides defining internal angles and external angles;
    wherein each of the internal angles and the external angles is at least 45 degrees and is less than 180 degrees, wherein the sides define a plurality of adjacent lobes disposed about a perimeter of the strengthening member, and wherein, along the perimeter of the thirty-six-cornered cross section, individual lobes of the plurality of lobes are separated by one external angle and include six internal angles and two external angles.

2. The strengthening member of claim 1, wherein individual lobes of the plurality of lobes include one side wall extending in a plane parallel to a first axis, two side walls extending in planes parallel to a second axis perpendicular to the first axis, and six side walls extending in planes disposed at a non-zero angle relative to the first axis.

3. The strengthening member of claim 1, wherein the thirty-six-cornered cross section defines twenty-four internal angles and twelve external angles.

4. The strengthening member of claim 3, wherein the twenty-four internal angles are greater than 90 degrees and the twelve external angles are approximately equal to 90 degrees.

5. The strengthening member of claim 3, wherein the twenty-four internal angles are greater than 90 degrees and the twelve external angles are greater than 90 degrees.

6. The strengthening member of claim 1, wherein each of the sides has a length ranging from about 10 mm to about 250 mm.

7. The strengthening member of claim 1, wherein a thickness of the sides and corners ranges from about 0.7 mm to about 6.0 mm.

8. The strengthening member of claim 1, wherein corners of the thirty-six-cornered cross section have substantially the same thickness as the sides of the cross section.

9. The strengthening member of claim 1, wherein the strengthening member has a continuous taper along a substantial length of the strengthening member from a first end of the strengthening member to a second end of the strengthening member.

10. The strengthening member of claim 1, wherein a first side wall of a first lobe is spaced a first distance from a second side wall of a second lobe adjacent to the first lobe along the perimeter, wherein a third side wall of the first lobe is spaced a second distance from a fourth side wall of a third lobe adjacent to the first lobe along the perimeter, and wherein the first distance is greater than the second distance.

11. A strengthening member for an automotive vehicle, comprising:
a thirty-six-cornered cross section having thirty-six sides and defining twenty-four internal angles and twelve external angles, wherein the cross section defines four adjacent lobes disposed about a central axis, wherein each lobe defines six internal angles and two external angles, and wherein, along a perimeter of the cross section, adjacent lobes define one external angle disposed therebetween.

12. The strengthening member of claim 11, wherein each of the internal angles and the external angles is at least 45 degrees and less than 180 degrees.

13. The strengthening member of claim 11, wherein the one external angle disposed between adjacent lobes is approximately 90 degrees.

14. The strengthening member of claim 11, wherein the one external angle disposed between adjacent lobes is less than 90 degrees.

* * * * *